US012793533B2

(12) United States Patent
Nong et al.

(10) Patent No.: US 12,793,533 B2
(45) Date of Patent: Nov. 10, 2026

(54) METHOD AND DEVICE FOR MINING ALARM CAUSALITY, AND STORAGE MEDIUM

(71) Applicant: ZTE CORPORATION, Shenzhen (CN)

(72) Inventors: Qingpeng Nong, Shenzhen (CN); Zhongliang Li, Shenzhen (CN); Xiangsheng Zhou, Shenzhen (CN); Hong Gao, Shenzhen (CN); Yaofeng Tu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 318 days.

(21) Appl. No.: 18/690,795

(22) PCT Filed: Jun. 14, 2022

(86) PCT No.: PCT/CN2022/098772
§ 371 (c)(1),
(2) Date: Mar. 11, 2024

(87) PCT Pub. No.: WO2023/040381
PCT Pub. Date: Mar. 23, 2023

(65) Prior Publication Data

US 2025/0111771 A1 Apr. 3, 2025

(30) Foreign Application Priority Data

Sep. 18, 2021 (CN) .......................... 202111113557.2

(51) Int. Cl.
*G08B 29/02* (2006.01)
*G06N 3/045* (2023.01)
(Continued)

(52) U.S. Cl.
CPC ............. *G08B 29/02* (2013.01); *G06N 3/045* (2023.01); *G06N 3/092* (2023.01); *G06N 5/025* (2013.01)

(58) Field of Classification Search
CPC ........ G08B 29/02; G06N 3/045; G06N 3/092; G06N 5/025; G06N 5/042; G06F 16/26; G06F 16/215; G06F 16/2228
See application file for complete search history.

(56) References Cited

U.S. PATENT DOCUMENTS

2019/0014488 A1* 1/2019 Tan ....................... H04W 24/02
2025/0132969 A1* 4/2025 Yen ....................... G06N 3/047

FOREIGN PATENT DOCUMENTS

CN 112003718 A 11/2020
CN 112100392 A 12/2020
(Continued)

OTHER PUBLICATIONS

International Search Report in Corresponding International Application No. PCT /CN2022/098772, mailed Sep. 14, 2022; 7 pgs.
(Continued)

*Primary Examiner* — Charles R Kasenge
(74) *Attorney, Agent, or Firm* — HAUPTMAN HAM, LLP

(57) ABSTRACT

A method for mining an alarm causality, a device for mining an alarm causality, and a storage medium. The method for mining the alarm causality includes: building a system alarm environment (101) for deep reinforcement learning based on system alarm information and root cause label data of the system alarm information; and learning and generating an alarm causality model (102) representing the alarm causality and structure through an interaction between a deep reinforcement learning agent and the system alarm environment.

13 Claims, 7 Drawing Sheets

(51) Int. Cl.
*G06N 3/092* (2023.01)
*G06N 5/025* (2023.01)

(56) References Cited

FOREIGN PATENT DOCUMENTS

| | | | |
|---|---|---|---|
| CN | 112181758 | A | 1/2021 |
| CN | 112217674 | A | 1/2021 |
| CN | 113220946 | A | 8/2021 |
| CN | 113240139 | A | 8/2021 |
| CN | 113901126 | A | 1/2022 |
| WO | 2021179643 | A1 | 9/2021 |

OTHER PUBLICATIONS

Written Opinion in Corresponding International Application No. PCT /CN2022/098772, mailed Sep. 14, 2022; 7 pgs.
Extended Search Report in Corresponding European Application No. 22868758.8, mailed Dec. 10, 2024; 8 pgs.
First Office Action in Corresponding Chinese Application No. 202111113557.2, dated Feb. 21, 2025; 17 pgs.

* cited by examiner

METHOD AND DEVICE FOR MINING ALARM CAUSALITY, AND STORAGE MEDIUM

CROSS-REFERENCE TO RELATED APPLICATIONS

The present application is the National Stage of International Application No. PCT/CN2022/098772, filed on Jun. 14, 2022, which claims priority to Chinese Patent Application 202111113557.2, filed on Sep. 18, 2021.

TECHNICAL FIELD

Embodiments of the present application relate to the technical field of the internet, and in particular to a method and a device for mining an alarm causality, and a storage medium.

BACKGROUND

In the technical field of data mining, it is usually necessary to mine and represent the causal relationship and structure among data variables. Causality mining algorithms are usually implemented by rule-based statistical methods. For example, mining is based on the co-occurrence frequency of variable pairs or the timing of variable fluctuations, and then variables are used to represent causal coefficients.

However, causal mining has theoretical flaws. Specifically, if causality is defined by rules, when the established rules cannot correctly represent the causal relationship, the causal relationship mined is invalid. However, based on co-occurrence frequency and timing, only the correlation between variables can be mined, but the causality cannot be represented. However, the current emerging causal reasoning methods require expert experience to provide variable causal hypotheses for verification mining or random causal hypothesis graphs for verification mining. There are problems such as difficulty in obtaining variable causal hypotheses and too large hypothesis space.

SUMMARY

An embodiment of the present application provides a method for mining an alarm causality, including: building a system alarm environment for deep reinforcement learning based on system alarm information and root cause label data of the system alarm information; and learning and generating an alarm causality model representing the alarm causality and structure through an interaction between a deep reinforcement learning agent and the system alarm environment.

An embodiment of the present application provides a device for mining an alarm causality, including: an agent module based on deep reinforcement learning and a system alarm environment module; the system alarm environment module is configured to build a system alarm environment for deep reinforcement learning based on system alarm information and root cause label data of the system alarm information; and the agent module is configured to interact with the system alarm environment module to learn and generate an alarm causality model representing the alarm causality and structure.

An embodiment of the present application provides a device for mining an alarm causality, including: at least one processor; and a memory communicated with the at least one processor; the memory stores instructions executable by the at least one processor, and the instructions are executed by the at least one processor so that the method for mining the alarm causality is realized by the at least one processor.

An embodiment of the present application provides a computer-readable storage medium, storing a computer program; when the computer program is executed by a processor, the method for mining the alarm causality is realized.

BRIEF DESCRIPTION OF THE DRAWINGS

One or more embodiments are exemplified by the pictures in the corresponding drawings, and these illustrative descriptions do not constitute a limitation to the embodiments. Elements with the same reference numerals in the drawings represent similar elements. Unless otherwise stated, the drawings are not limited to scale.

DETAILED DESCRIPTION OF THE EMBODIMENTS

In order to make the purpose, technical solutions and advantages of the embodiments of the present application clearer, the embodiments of the present application will be described in detail below with reference to the accompanying drawings. However, those skilled in the art can understand that in each embodiment of the present application, many technical details are provided for readers to better understand the present application. However, even without these technical details and various changes and modifications based on the following embodiments, the technical solutions claimed in the present application can also be realized. The division of the following embodiments is for the convenience of description, and should not constitute any limitation to the specific implementation of the present application, and the embodiments can be combined and referred to each other on the premise of no contradiction.

In the description of the disclosure of the present application, it should be understood that the terms “first”, “second” and so on are only used for descriptive purposes, and should not be understood as indicating or implying relative importance. In addition, in the description disclosed in the present application, unless otherwise specified, “plurality” means two or more.

The purpose of the embodiments of the present application is to provide a method for mining an alarm causality, a device for mining an alarm causality, and a storage medium, which can obtain an alarm causality model based on deep reinforcement learning, avoid the use of manual rules, and realize accurate mining and representing of alarm causality.

Figure 1:
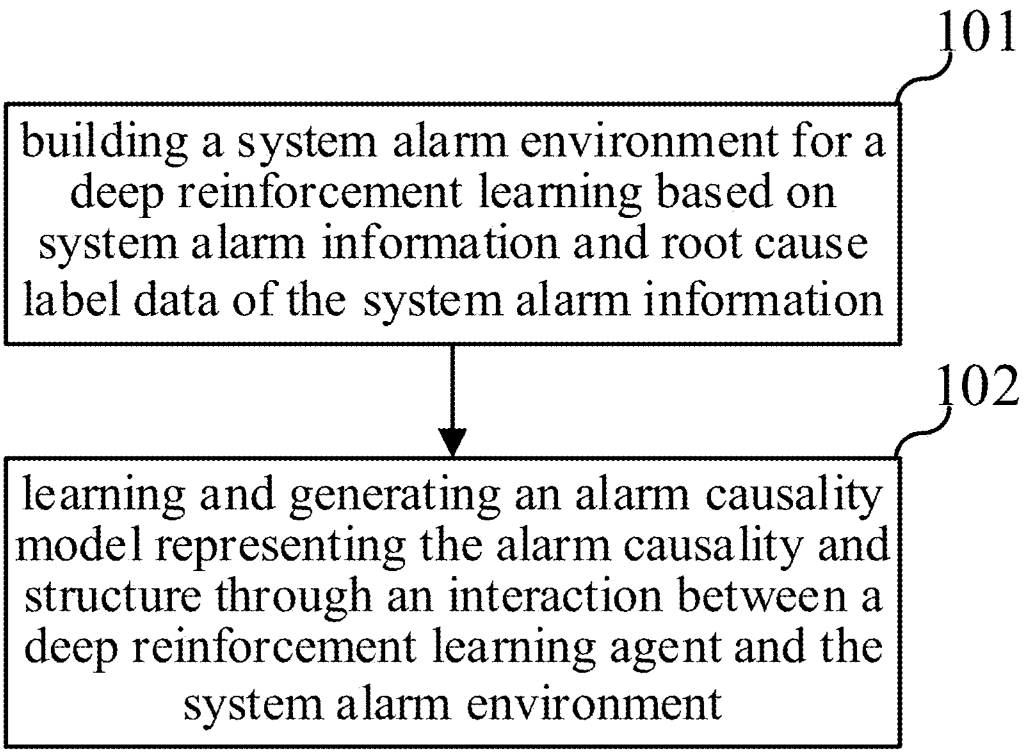
FIG. 1 is a flowchart of a method for mining an alarm causality according to an embodiment of the present application.

In the embodiment of the present application, the method for mining the alarm causality shown in FIG. 1 is executed by the device for mining the alarm causality, at least including but not limited to the following steps.

Step 101: building a system alarm environment for deep reinforcement learning based on system alarm information and root cause label data of the system alarm information.

Step 102: learning and generating an alarm causality model representing the alarm causality and structure through an interaction between a deep reinforcement learning agent and the system alarm environment.

In the embodiment of the present application, the system alarm environment of deep reinforcement learning is built according to the system alarm information and the root cause label data of the system alarm information, and the agent of deep reinforcement learning conducts exploratory interaction with the system alarm environment to continuously explore and optimize the mining and representing of the causal relationship between alarm variables to obtain the alarm causality model. By using the alarm causality model, the accurate mining and representation of the alarm causality is realized. The alarm causality model is obtained through deep reinforcement learning, avoiding the use of manual rules, thereby avoiding the problem of invalid causality caused by rule errors, and also avoiding the difficulty of obtaining variable causal assumptions and the problem of excessive hypothesis space.

In one embodiment, based on the system alarm information and the root cause label data of the system alarm information, building a system alarm environment for deep reinforcement learning includes: obtaining a system alarm graph indicating the system alarm information and the root cause label data of the system alarm information; The system alarm graph includes the alarm category index, alarm feature vector and root cause label of each node of the system; according to the system alarm graph, the system alarm environment is built. Specifically, the device for mining the alarm causality includes a system alarm environment module, and the system alarm environment module builds a system alarm environment according to the system alarm graph. The system alarm environment is built through the alarm graph, which makes the relationship between each node of the system more intuitive.

In one example, the system alarm graph can be generated by the system alarm graph generation module. The process of generating the system alarm graph based on the system alarm information by the system alarm graph generation module is illustrated below with an example.

For example, the system alarm information includes system alarm log data (as shown in Table 1) and alarm key performance indicator (KPI) information (as shown in Table 2). In Table 1 and Table 2, node represents a node. In Table 1, CPU Steal Time represents the CPU stealing time. In Table 2, CPU: *% means CPU usage *%, Mem: *% means memory usage *%, InputR: *% means data input rate is *%, OutputR: *% means data output rate is *%.

TABLE 1

| node | alarm log data | is it the root cause? |
|---|---|---|
| node_1 | http://*****, slow response (the call takes more than 1000 ms) times: 309 times (greater than the threshold: 200 times) | 0 |
| node_2 | CPU Steal Time exceeds 10% for 5 minutes | 0 |
| node_3 | port 80 communication abnormality | 1 |
| node_4 | CPU Steal Time continues to exceed 30% for 5 minutes | 0 |

TABLE 2

| node | alarm KPI information |
|---|---|
| node_1 | CPU: 95%, Mem: 86%, InputR: 67%, OutputR: 87% |
| node_2 | CPU: 65%, Mem: 46%, InputR: 87%, OutputR: 67% |
| node_3 | CPU: 85%, Mem: 46%, InputR: 97%, OutputR: 27% |
| node_4 | CPU: 65%, Mem: 46%, InputR: 87%, OutputR: 67% |

The system alarm graph generation module obtains the system alarm information shown in Table 1 and Table 2, and performs cleaning and convergence processing on the system alarm information to remove numerical fields, invalid character fields, etc. in the system alarm information. The system alarm graph generation module classifies the processed data and assigns the alarm category index (Identity Document, ID) to obtain the system alarm category set dictionary. For example, the alarm category set dictionary generated based on Table 1 is:

```
{
1: 'http://*, slow response (the call takes more than *ms) times:
   * times (greater than threshold: * times)',
2: 'The CPU Steal Time lasts for * minutes and exceeds *%',
3: 'Port * communication abnormality'
}.
```

The alarm category set dictionary indicates the corresponding relationship between the alarm category index and the actual alarm category. In the process of generating the system alarm graph, the system alarm graph generation module can search the alarm category set dictionary according to the alarm category corresponding to the system alarm information of each node, and determine the alarm category index corresponding to the system alarm information, so that the alarm category index corresponding to the system alarm information is recorded in the corresponding node of the system alarm graph, for the system alarm environment to respond to the instructions issued by the agent according to the alarm category index of each node.

Optionally, before or after obtaining the system alarm category set dictionary and the alarm category index of each node, the system alarm graph generation module can digitize the alarm log data and alarm KPI information of each node in the system. For example, through word2vec technology, the alarm log data and alarm KPI information are converted into vectors. For example, based on the system alarm information of node_1 to node_3 in Table 1 and Table 2, the generated vectors are shown in Table 3.

TABLE 3

| node | log vector and KPI vector | is it the root cause? |
|---|---|---|
| node_1 | log vector: [2.0, 3.1, 6.3, 9.1, 7.8, 5.1]<br>KPI vector: [95, 86, 87] | 0 |
| node_2 | log vector: [5.0, 3.8, 3.3, 9.1, 7.8, 5.1]<br>KPI vector: [46, 87, 67] | 0 |
| node_3 | log vector: [5.0, 3.8, 3.3, 9.1, 7.8, 5.1]<br>KPI vector: [46, 97, 27] | 1 |

After obtaining the vector generated based on the alarm log data (referred to as the log vector) and the vector generated based on the alarm KPI information (referred to as the KPI vector) as shown in Table 3, for each node, the system alarm graph generation module merges the log vector and the KPI vector of the node to obtain the alarm feature vector of the node. The manner of merging the log vector and the KPI vector may be, for example, merging the log vector and the KPI vector into one vector, as shown in Table 4.

TABLE 4

| node | alarm feature vector of node | is it the root cause? |
|---|---|---|
| node_1 | [2.0, 3.1, 6.3, 9.1, 7.8, 5.1, 95, 86, 87] | 0 |
| node_2 | [5.0, 3.8, 3.3, 9.1, 7.8, 5.1, 46, 87, 67] | 0 |
| node_3 | [5.0, 3.8, 3.3, 9.1, 7.8, 5.1, 46, 97, 27] | 1 |

After obtaining the alarm category index and alarm feature vector of each node, the system alarm graph generation module generates a system topology graph according to the system topology data; the system topology graph, root cause label data, and the alarm category index and alarm feature vector of each node are combined to generate a system alarm graph. Among them, the topology graph includes nodes and edges. Nodes in the system can be microservices, component instances, etc., and edges can be defined as relationships such as microservice call relationships and microservice data flow directions. The root cause label data is used to indicate the root cause node. Specifically, in the system, if a node fails and spreads rapidly, triggering a failure alarm of its adjacent nodes, this node can be called the root cause node. The system alarm graph generation module combines the system topology graph, the root cause label data, and the alarm feature vector and alarm category index of each node to obtain the system alarm graph. In the system alarm graph, each node can be, for example, an instantiated node of the system (such as a microservice component), the feature value v of the node is the alarm feature vector of the node, the feature value Wid of the node is the alarm category index, and the feature value rcn of the node is the root cause label.

Figure 2:
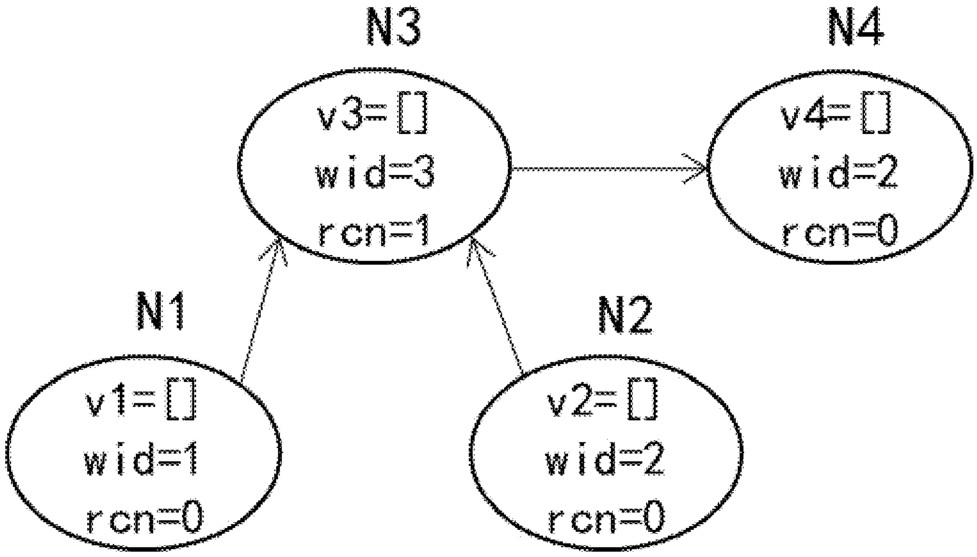
FIG. 2 is a system alarm graph generated based on table 1 and table 2 according to an embodiment of the present application.

For example, if the system topology data corresponding to Table 1 and Table 2 is: {"node_1": ["node_3"], "node_2": ["node_3"], "node_3": ["node_4"]}, based on the Table 1 and Table 2, the generated system alarm graph shown in FIG. 2. Among them, "node_1": ["node_3"] indicates that the out-degree node of "node_1" is "node_3", "node_2": ["node_3"] indicates that the out-degree node of "node_2" is "node_3", "node_3": ["node_4"] indicates that the out-degree node of "node_3" is "node_4". N1 indicates node_1, v1 indicates the alarm feature vector of node_1, N2 indicates node_2, v2 indicates the alarm feature vector of node_2, N3 indicates node_3, v3 indicates the alarm feature vector of node_3, N4 indicates node_4, and v4 indicates the alarm feature vector of node_4. Wid indicates the alarm category index, and ron indicates the root cause node label. rcn=0 indicates that the node is not a root cause node, and rcn=1 indicates that the node is a root cause node.

It should be noted that those skilled in the art can understand that the above example is a processing process of a sample of alarm information. In actual processing, batch sample data can be processed to obtain a system alarm graph set, and a system alarm environment can be built based on the system alarm graph set. This embodiment does not limit the number of system alarm information.

It should be noted that those skilled in the art can understand that the system alarm information can also include a kind of alarm information in the system alarm log data and alarm KPI information, and the system alarm graph generation module uses the vector of the alarm information as the alarm feature vector of the node.

It should be noted that those skilled in the art can understand that the system alarm information may also include other alarm information, which is not limited in this embodiment.

It should be noted that those skilled in the art can understand that in this embodiment, the system alarm graph generation module can be a virtual module inside the device for mining the alarm causality, or it can be a module of other devices independent of the device for mining the alarm causality. This example does not limit the relationship between the system alarm graph generation module and the device for mining the alarm causality.

In one embodiment of the present application, the system alarm environment can establish a corresponding relationship between the alarm category index and the mining action index according to the alarm category index in the alarm category set dictionary, so that when the mining action index issued by the agent is received, according to the corresponding relationship between the mining action index and the alarm category index, the next node corresponding to the mining action index is determined, and the environment state of the system alarm environment is adjusted.

Figure 3:
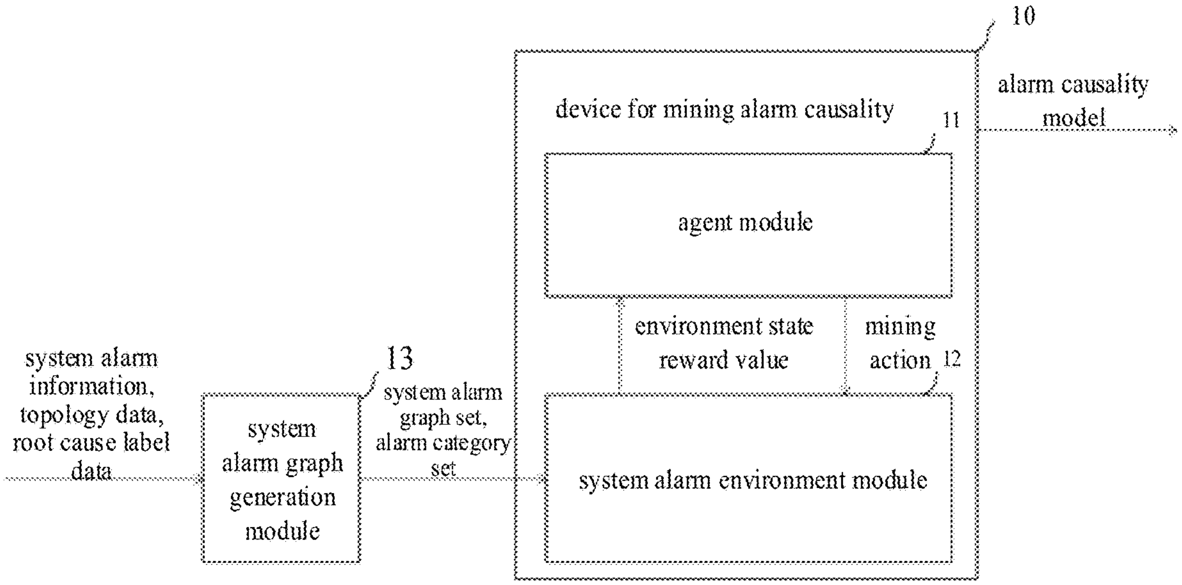
FIG. 3 is a schematic structural diagram of a device for mining an alarm causality according to an embodiment of the present application.

In one embodiment, the agent interacts with the system alarm environment through deep reinforcement learning, and learns and generates an alarm causality model representing the alarm causality and structure, including: the agent selects a mining action according to the current environment state of the system alarm environment; the system alarm environment feeds back the reward value and inherited state to the agent according to the mining action, root cause label, state transfer mechanism and reward mechanism; among them, the index of the mining action corresponds to the index of the alarm category; the agent learns and generates an alarm causality model that characterizes alarm causality and structure. Specifically, based on the deep reinforcement learning model, the device for mining the alarm causality is built. As shown in FIG. 3, the device for mining the alarm causality 10 includes an agent module 11 and a system alarm environment module 12. The agent module 11 is responsible for the generation and learning of alarm mining strategies, and completes the mining of the causal relationship of alarm variables and the representation of the causal structure. The system alarm environment module 12 builds the system alarm environment according to the system alarm graph set and the alarm category set generated by the system alarm graph generation module 13, manages the state transfer mechanism and the action reward mechanism, and responds to mining actions issued by the agent module 11 according to the state transfer mechanism and the action reward mechanism. The system alarm environment module 12 can also provide an environment interaction interface, so as to provide the agent module 11 with a system alarm environment for mining the causality of alarm variables. The system alarm environment module 12 stores a system alarm graph with root cause node labels, and the system alarm graph is composed of system nodes and relationship edges. Among them, the nodes of the system are microservice components, and the characteristics of the nodes are the characteristics of the alarm state, that is, the alarm feature vector; the relationship edge is the business relationship between the microservices, which can be the relationship between the call relationship and the data flow relationship between the microservices. The root cause node label indicates whether the node is the root cause of the system alarm graph. The agent module 11 conducts exploratory interaction with the system alarm environment module 12, and explores and walks the target node (root cause node) from the initial node during the interaction process. The agent module 11, through continuously maximizing the cumulative value of mining action reward, continuously explores and optimizes to complete the mining and representation of the causal relationship between alarm variables to obtain an alarm causality model.

In one embodiment, the system alarm environment module 12 includes: an environment state representation and transfer function component, an environment action space function component, an alarm causality mining reward function component and an environment state reset function component.

The functions of each function component are illustrated as follows.

1. Environment State Representation and Transfer Function Component

The environment state representation and transfer function component is responsible for the environment state management of the system alarm environment, and stores the representation mechanism and state transfer mechanism of the environment state. The interactive operation between the agent module 11 and the system alarm environment module 12 includes: the agent module 11 selects the corresponding mining action according to the environment state of the current system alarm environment, and the system alarm environment module 12 transits the system alarm environment to the corresponding inherited state according to the current environment state and the mining action.

In one example, in the representation mechanism of the environment state, the environment state of the system alarm environment is determined according to the alarm state of the current node, and the alarm state of the current node is generated according to the alarm feature vector of the current node and the alarm feature vector of the adjacent nodes of the current node. Specifically, the alarm state of the current node consists of two parts: the alarm state of the node itself and the alarm state of adjacent nodes. The adjacent nodes of the current node are the out-degree adjacent nodes or the in-degree adjacent nodes of the current node. In the system alarm graph, the source node of the edge is the in-degree adjacency point of the target node, and the target node of the edge is the out-degree adjacency point of the source node. Considering that in the case of different out-degree adjacent nodes or in-degree adjacent nodes, the expected inherited nodes of nodes with the same alarm feature vector may be inconsistent. In this embodiment, the alarm feature vector of the current node and the alarm feature vector of adjacent nodes can be obtained according to the current node and the current system alarm graph. These two alarm feature vectors are fused to serve as the alarm state of the current node, and the alarm state of the current node is used as the environment state of the system alarm environment. The environment state (State) of the system alarm environment is characterized by the fusion of the alarm feature vector of the current node and the alarm feature vector of the out-degree adjacent nodes (or in-degree adjacent nodes), which is convenient for the agent module 11 to select mining actions.

It should be noted that those skilled in the art can understand that whether the adjacent node is an out-degree adjacent node or an in-degree adjacent node can be selected according to an application scenario, which is not limited in this embodiment.

In one example, the process of merging the alarm feature vector of the current node and the alarm feature vectors of the adjacent nodes of the current node to obtain the alarm state of the current node is as follows: calculating the first fusion feature vector of the alarm feature vectors of the adjacent nodes of the current node, and the first fusion feature vector is the mean value of the alarm feature vectors of the adjacent nodes of the current node; splicing the alarm feature vector of the current node with the first fusion feature vector to obtain a second fusion feature vector, and the second fusion feature vector is the alarm state of the current node.

Figure 4:
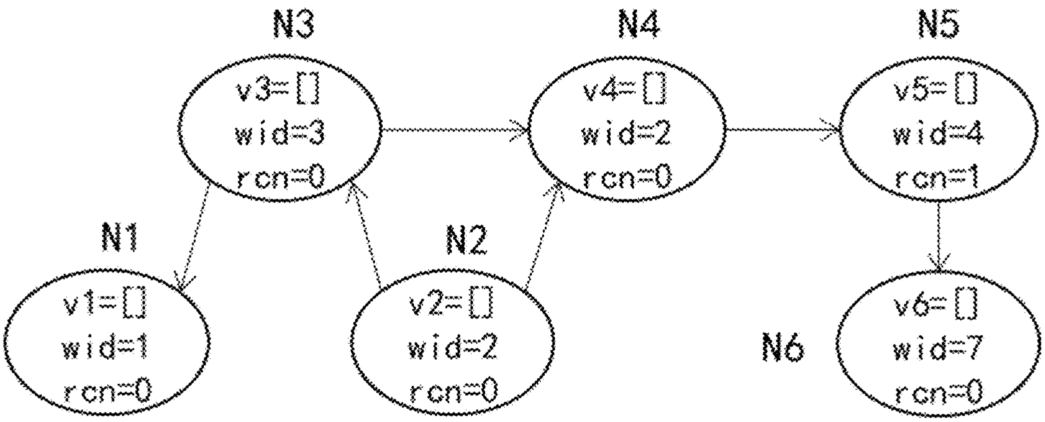
FIG. 4 is another system alarm graph according to an embodiment of the present application.

Taking the system alarm graph as shown in FIG. 4, the adjacent node is the out-degree adjacent node, and the current node is N3 as an example to illustrate the fusion process. The out-degree adjacent nodes of N3 are node N4 and node N1, and the environment state of the system alarm environment is [v3, (v4+v1)/2]. For example, v3=[1,2,3], v1=[2,3,4], v4=[2,5,6], then by calculation, you can get: v4+v2=[4,8,10], (v4+v1)/2=[2,4,5], [v3,(v4+v1)/2]=[1,2,3, 2,4,5]).

Figure 5:
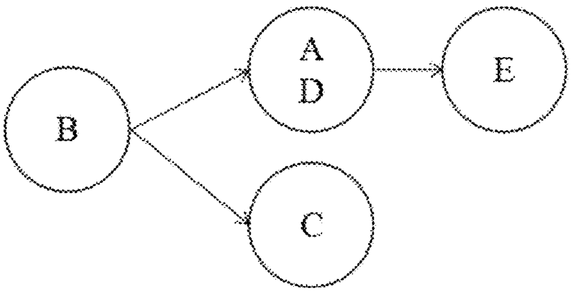
FIG. 5 is a schematic diagram of a state space of a system alarm environment according to an embodiment of the present application.

In one example, the state transfer mechanism is responsible for determining the inherited state and inherited node of the system alarm environment according to the environment state of the current system alarm environment, the mining action, and the local action space of the current node. Specifically, the state transfer mechanism includes: when the mining action belongs to the local action space of the current node, the adjacent node of the current node that contains the alarm category index corresponding to the index of the mining action is taken as the inherited node; the alarm state of the inherited node is taken as the inherited state of the system alarm environment; in the case that the mining action does not belong to the local action space of the current node, the inherited state of the system alarm environment is set to a specified state, for example, zero state. Specifically, the definition of the node transfer action in the system alarm graph may be an action selected (or executed) for transferring from the current node to the desired node. Node transfer actions are divided into global action space and local action space. The global action space refers to the optional transfer action space in the sample environment of the alarm graph of the whole system. The local action space refers to the transfer action space (effective action space) allowed by the sample environment where the current step is located. For example, as shown in FIG. 5, the state space of a certain system alarm environment is ABCDE, and action IDs are assigned to each state: 1:A, 2:B, 3:C, 4:D, 5:E. If the current state is B, then the global action space is {1,2,3,4,5}. If the node where the current step is located is node B and its local action space is {1,3,4}, it can choose action 3 to transfer to node C, but node B cannot transfer to node E.

For example, the index of the mining action is consistent with the index of the alarm category. Taking FIG. 4 as an example, for node N2, its local action space is {2, 3}. If the index of the mining action of the agent module 11 is 2, it corresponds to node N4 of wid=2, the node N4 is used as the inherited node to perform state transfer; and according to the alarm state of the inherited node, the inherited state (State_) of the system alarm environment is obtained. If the index of the mining action is 3, corresponding to the node N3 with wid=3, the node N3 is used as the inherited node to perform state transfer; and according to the alarm state of the inherited node, the inherited state (State_) of the system alarm environment is obtained. If the mining action is not 2 and 3, for example, the index of the mining action is 5, which is not in the local action space of the current node, then it is judged that the mining action is an illegal action, and the node transfer is not performed, and the inherited state (State_) of the system alarm environment is directly set to the specified state, such as the zero state.

In this embodiment, the accuracy of the node feature representation and the rationality of the transfer in the system alarm graph are guaranteed through the environment state representation mechanism and the state transfer mechanism.

It should be noted that those skilled in the art can understand that the specified state may also be other states, which is not limited in this embodiment.

2. Environment Action Space Function Component

Responsible for the design of the action space of the interactive environment. Specifically, during the interaction process between the agent module 11 and the system alarm environment module 12, the meaning of the mining action is to select the corresponding mining action according to the alarm (result alarm) state of the current node, and transfer to the node of the cause alarm, so the definition of the mining action can be options for the cause alarm. The system alarm information is collected (including but not limited to system alarm log data and KPI data), cleaned and converged through the system graph generation module, and then the system alarm information is classified and indexed. In this embodiment, the alarm category space is the action space, and the environment state representation and transition function component corresponds each mining action to each alarm category, and the mining action index corresponds to the alarm category index one by one.

3. Alarm Causality Mining Reward Function Component

The alarm causality mining reward function component is responsible for feeding back corresponding rewards to the agent module 11 according to the reward mechanism, current environment state and execution actions, and the rewards represent the quality of the mining actions performed in the current state. Because in the same environment state, the rewards obtained by performing different mining actions are different, and the goal of the rewards is to better guide the agent module 11 to walk from the initial node to the target node (for example, it can be the root cause node of the system alarm graph) to quickly complete the mining and representation of the causal relationship of alarm variables.

Optionally, the reward mechanism includes: determining the reward value according to whether the mining action belongs to the local action space of the current node, and after the mining action is performed, the type of the inherited node of the system alarm environment. Specifically, the system alarm environment module 12 performs a state transfer after executing the mining action, and transfers the environment state of the system alarm environment to the inherited state, which is reflected in the system alarm graph as transferring from the current node to the inherited node.

Optionally, the inherited nodes are divided into four categories: root cause nodes, in-degree adjacent nodes of root cause nodes, zero out-degree nodes (or non-root cause nodes) and normal nodes. The root cause node is the root cause node of the current system alarm graph, for example, node N5 in FIG. 4. The in-degree adjacent node of the root cause node is the source node of the in-degree edge of the root cause node. For example, in FIG. 4, the root cause node N5 has an in-degree edge N4→N5, and its source node is N4, so N4 node is the in-degree adjacent nodes of the root cause node N5. A zero-out-degree node is a node with an out-degree of 0 and is not a root node, such as nodes N1 and N6 in FIG. 4, whose out-degree edge is equal to 0. Nodes other than the above types of nodes are classified as normal nodes, such as node N2 and node N3 in FIG. 4. During the interaction process, the system alarm environment module 12 executes the mining action and transfers the system alarm environment from the current node to the inherited node. If the currently executed mining action is an illegal action, a negative reward will be fed back; if the currently executed mining action belongs to the action in the local action space of the current node, and the inherited node is the root cause node, then a positive reward will be fed back; if the currently executed mining action belongs to the action in the local action space of the current node, and the inherited node is the in-degree adjacent node of the root cause node, then a positive reward will be fed back; if the currently executed mining action belongs to the action in the local action space of the current node, and the inherited node is a zero out-degree node, then a negative reward will be fed back; if the currently executed mining action belongs to the action in the local action space of the current node, and the inherited node is a normal node, 0 reward will be fed back.

For example, when the current node is node N2, when transferring to node N3, N3 is a normal node, so the feedback reward is 0; and when transferring from node N3 to node N4, because node N4 is the in-degree adjacent node of the root cause node, the feedback is positive reward; when transferring from node N4 to node N5, because node N5 is the root cause node, so the feedback is positive reward; if transferring from node N3 to node N1, because node N1 is a zero out-degree node, so the feedback is negative reward; if the node N3 performs an illegal action, it will feed back negative reward.

It should be noted that those skilled in the art can understand that the specific reward value of the above positive reward and negative reward can be set according to the characteristics of the present application scenario, which is not limited in this embodiment.

It is worth mentioning that through the establishment of a reward mechanism, the correct guidance of causal alarm mining action is realized, and the legality of mining action is guaranteed.

4. Environment State Reset Function Component

The environment state reset function component is responsible for resetting the system alarm environment according to the environment state reset mechanism. Specifically, in the process of interaction between the agent and the system alarm environment, it also includes: after the system alarm environment executes the mining action sent by the agent, if the interaction termination condition is met, the environment state reset mechanism is triggered.

Optionally, the termination condition for the interaction between the agent and the system alarm environment includes at least one of: the number of interactions reaches an interaction threshold, the inherited node is the root cause node, or the mining action does not belong to the local action space of the current node. Specifically, the termination conditions for the interaction between the agent and the system alarm environment include but are not limited to: the number of mining explorations (i.e., the number of interactions) in the current interaction cycle reaches a specified value (i.e., the interaction threshold), and the mining exploration reaches the root cause node of the system alarm graph (i.e., the inherited node is the root cause node) and the agent outputs illegal mining actions. Illegal mining actions refer to actions that do not belong to the local action space of the current node. When any one of the above conditions is met, the system alarm environment is reset, and the next cycle of alarm causality mining is carried out.

Optionally, the mechanism for resetting the environment state includes: randomly selecting a system alarm graph as the system alarm graph of the system alarm environment, based on the system alarm graph set generated by the system alarm information and the root cause label data of the system alarm information; In the system alarm graph of the alarm environment, a node whose out-degree or in-degree is not 0 is selected as the start node; the alarm state of the start node is used as the environment state of the system alarm environment, and feed it back to the agent so that the agent and the system alarm environment is reinteracted.

In one embodiment, the agent is responsible for generating corresponding mining action (Action) to interact with the system alarm environment according to the environment state of the system alarm environment, so as to realize alarm causal structure mining and representation, and its functions include mining and representation.

Figure 6:
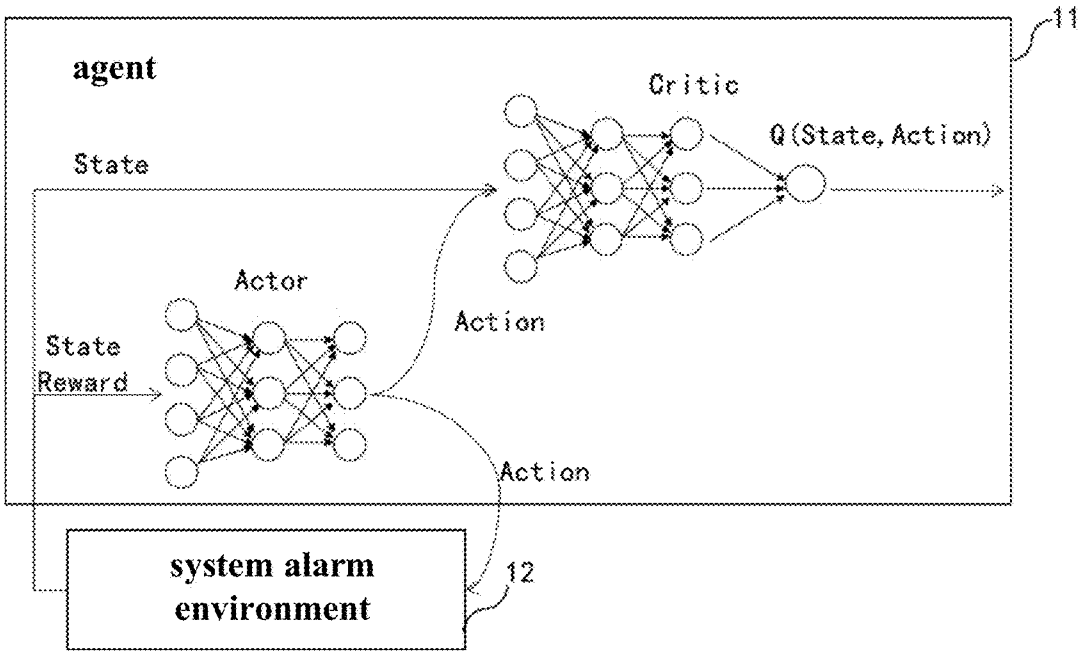
FIG. 6 is a schematic structural diagram of an A2C model according to an embodiment of the present application.

Optionally, the agent can adopt the A2C model of the actor-critic architecture in the deep reinforcement learning model. The structure of the A2C model is shown in FIG. 6. The agent 11 consists of an actor (Actor) network model and a critic (Critic) network model. Among them, the Actor network model is responsible for generating mining action (Action) according to the environment state (State) of the system alarm environment 12. Therefore, the input dimension of the Actor model is consistent with the environment state (State) space dimension of the system alarm environment, and the output dimension is consistent with the action (Action) space dimension of the system alarm environment. The Critic network model is responsible for evaluating the action-state Q value: Q (State, Action), which is used for the optimization of the Actor network model, so the input dimension of the Critic network model=State space dimension+Action space dimension, and the output dimension=1.

The method for mining the alarm causality mentioned in this embodiment is illustrated below in combination with different meanings of different system alarm information and topological edges in the system alarm graph.

Figure 7:
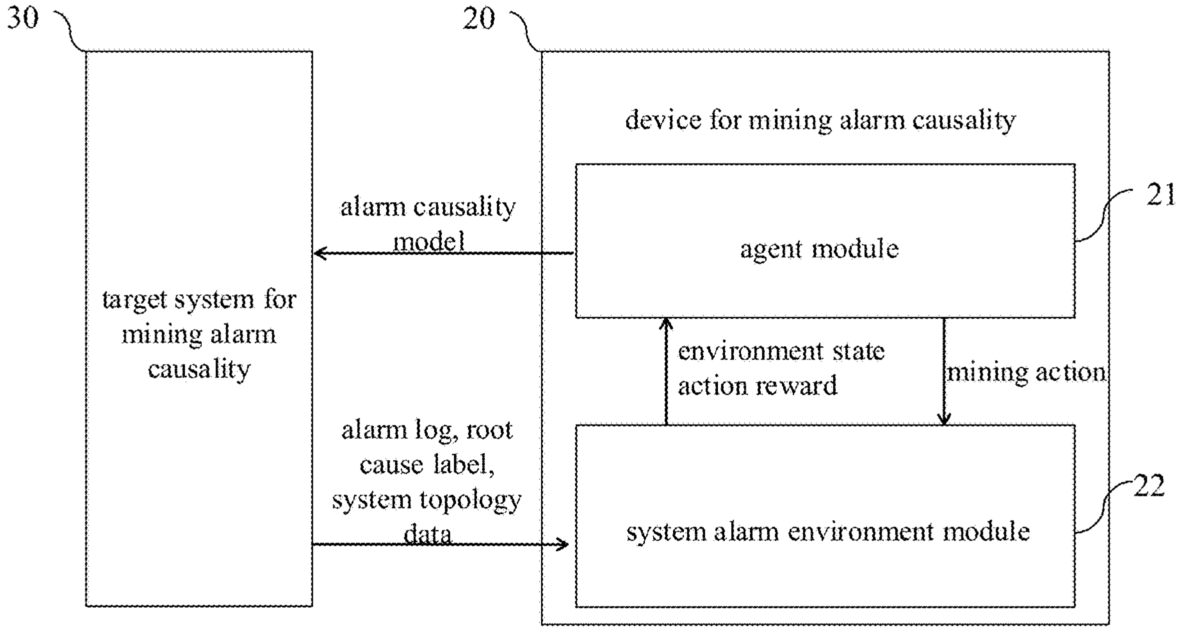
FIG. 7 is a schematic diagram of an interaction between the device 20 for mining the alarm causality and a target system 30 for mining the alarm causality according to an embodiment of the present application.
Figure 8:
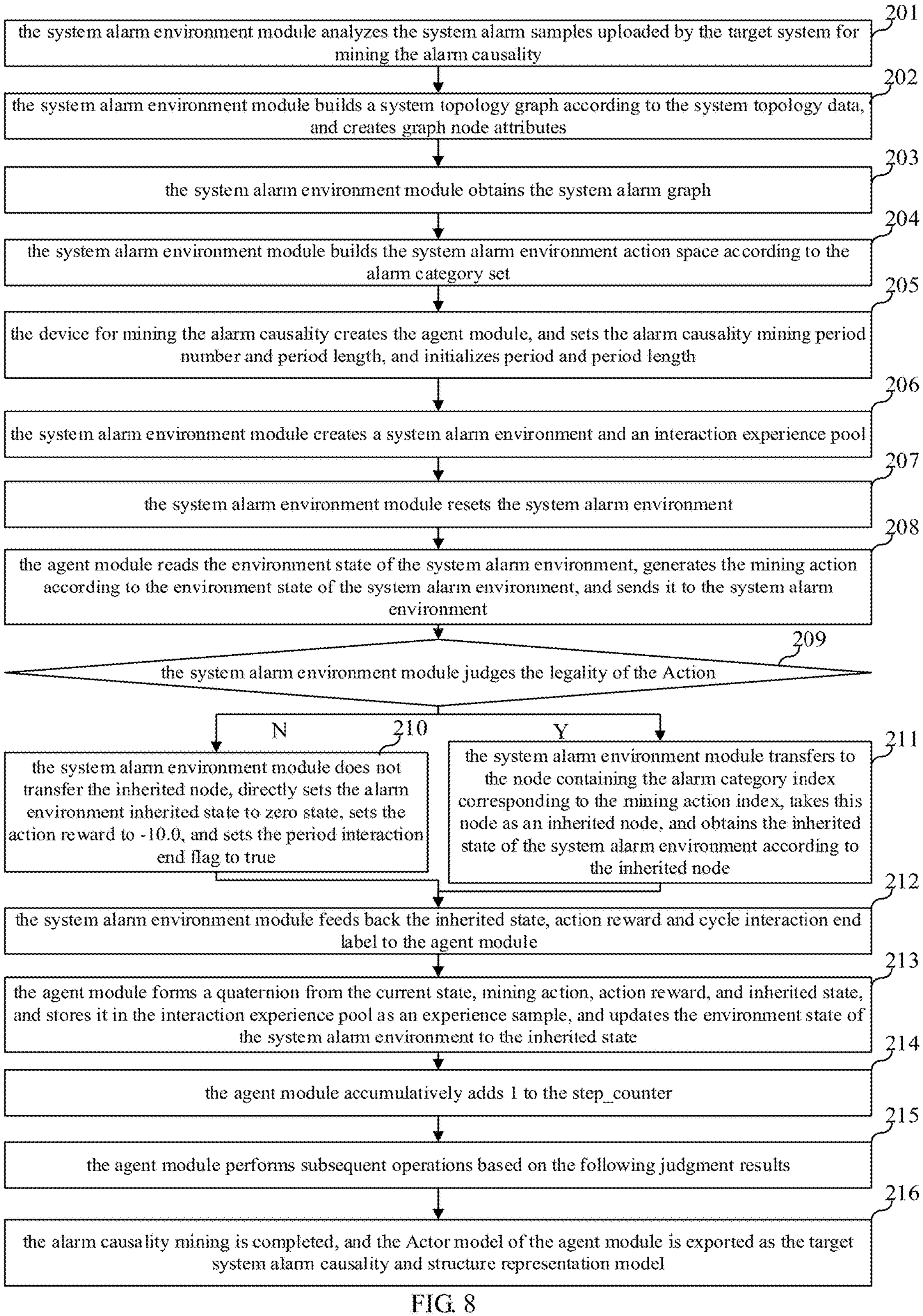
FIG. 8 is a schematic diagram of a process of obtaining an alarm causality model by the device 20 for mining the alarm causality according to an embodiment of the present application.

In one embodiment, as shown in FIG. 7, the device for mining the alarm causality 20 is communicatively connected with the target system for mining the alarm causality 30. The target system for mining the alarm causality 30 collects system alarm logs and system topology, labels the root causes, packages them into system alarm samples, and uploads the system alarm samples to the device for mining the alarm causality 20. For example, as shown in FIG. 8, the device for mining the alarm causality 20 includes an agent module 21 and a system alarm environment module 22, and the steps for obtaining the alarm causality model are as follows:

Step 201: the system alarm environment module 22 analyzes the system alarm samples uploaded by the target system for mining the alarm causality 30.

Step 202: the system alarm environment module 22 builds a system topology graph according to the system topology data, and creates graph node attributes. Node attributes include alarm feature vector v, alarm category index wid and node root cause label rcn. The alarm logs of all system alarm samples are cleaned, converged, and classified to obtain the alarm category set, and assign indexes to the alarm categories.

Step 203: the system alarm environment module 22 obtains the system alarm graph. Specifically, taking a single sample as an example, the system alarm environment module 22 combines word2vec technology to vectorize the alarm log of the node, obtain the feature vector of the alarm log of the node, and assign it to the attribute v of the node corresponding to the system topology graph; according to the distribution result of the alarm category index in the step 203, the alarm category index of the node is obtained, and the attribute wid of the node corresponding to the system topology graph is assigned; the attribute rcn value of the root cause node in the system topology graph is set to 1 according to the root cause label information, and the attribute rcn value of other node is set to 0.

The system alarm graph obtained above is stored in the system alarm graph set.

Step 204: the system alarm environment module 22 builds the system alarm environment action space according to the alarm category set. Specifically, each alarm category corresponds to a mining action, and the mining action index is consistent with the alarm category index.

Step 205: the device for mining the alarm causality 20 creates the agent module 21, and sets the alarm causality mining period number (episode_num) and period length (episode_len), and initializes period and period length counters episode_counter=0, step_counter=0. The agent module 21 may include an Actor model and a Critic model.

Step 206: the system alarm environment module 22 creates a system alarm environment and an interaction experience pool.

Step 207: the system alarm environment module 22 resets the system alarm environment. First, a system alarm graph is randomly obtained from the system alarm graph set as the current system alarm graph A, and then a node with an out-degree not 0 is randomly selected from the current system alarm graph A as the current node, and finally the environment state (State) of the system alarm environment is fused to obtain according to the alarm feature vector v of the current node and its adjacent nodes, and the environment state of the system alarm environment is fed back to the agent module 21.

Step 208: the agent module 21 reads the environment state of the system alarm environment, generates the mining action (Action) according to the environment state of the system alarm environment, and sends it to the system alarm environment.

Step 209: the system alarm environment module 22 judges the legality of the Action, that is, judges whether the mining action is in the local action space of the current node. If the Action is illegal, go to step 210. If legal, go to step 211.

Step 210: the system alarm environment module 22 does not transfer the inherited node, directly sets the alarm environment inherited state (State) to zero state, sets the action reward to −10.0, and sets the period interaction end label (done) to true (True). Then step 212 is executed.

Step 211: the system alarm environment module 22 transfers to the node containing the alarm category index (wid) corresponding to the mining action index, takes this node as an inherited node, and obtains the inherited state (State) of the system alarm environment according to the inherited node. If the inherited node is rcn=1, then the action reward (reward) is set to 50.0, and the cycle interaction end label (done) is set to True; if the out-degree of the inherited node=0, then the action reward is set to −1.0, the cycle interaction end label is set to True; if the inherited node is the in-degree adjacent node of the root cause node, then the action reward is set to 1.0, and the cycle interaction end label is set to false (False); if the inherited node is a normal node, then the action reward is set to 0.0, the period interactive end label is set to False.

Step 212: the system alarm environment module 22 feeds back the inherited state, action reward and cycle interaction end label to the agent module 21.

Step 213: the agent module 21 forms a quaternion (State, Action, reward, State_) from the current state, mining action, action reward, and inherited state, and stores it in the interaction experience pool as an experience sample, and updates the environment state (State) of the system alarm environment to the inherited state State_.

Step 214: the agent module 21 accumulatively adds 1 to the step_counter.

Step 215: the agent module 21 performs subsequent operations based on the following judgment results:

If it is determined that the cycle interaction label 1 done=False and step_counter<episode_len, jump to step 208;

If the cycle interaction label done=True or step_counter>=episode_len, then the episode_counter is accumulated by 1, and the model optimization (comprising the Actor model and the Critic model) of the agent module 21 is performed using the experience samples in the interaction experience pool, so that the agent module 21 can maximize the cumulative return of interactions;

If episode_counter<episode_num, go to step 207, otherwise go to step 208.

Step 216: the alarm causality mining is completed, and the Actor model of the agent module 21 is exported as the target system alarm causality and structure representation model. It can provide secondary development support for the root cause location of system failures.

Figure 9:
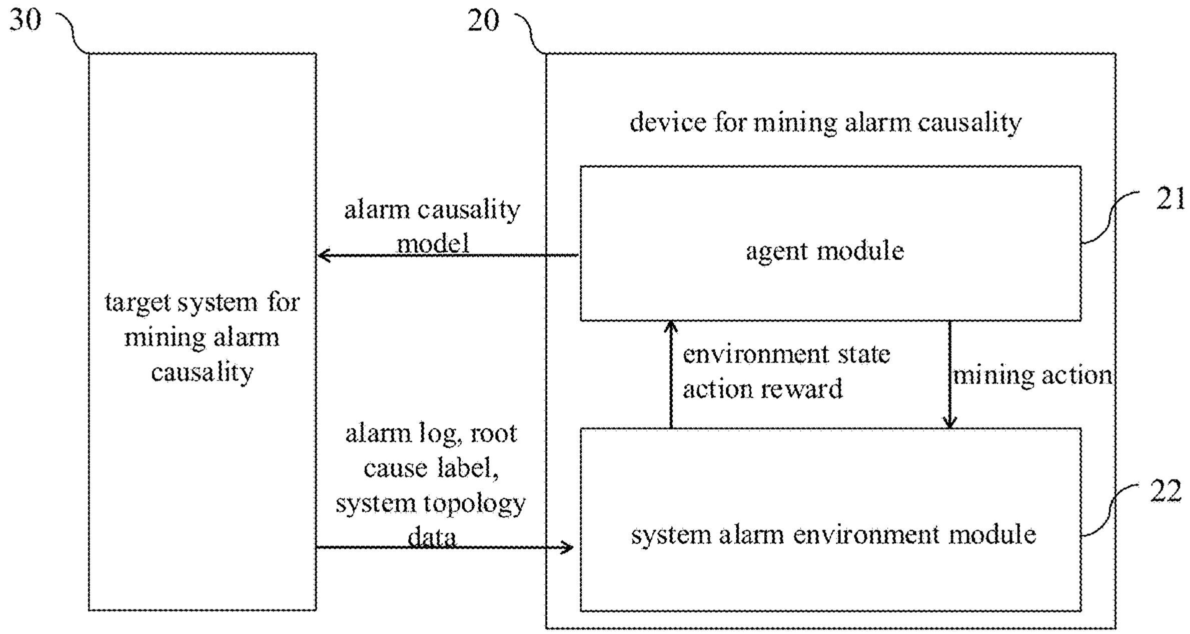
FIG. 9 is a schematic diagram of the interaction between the device 20 for mining the alarm causality and the target system 30 for mining the alarm causality according to another embodiment of the present application.
Figure 10:
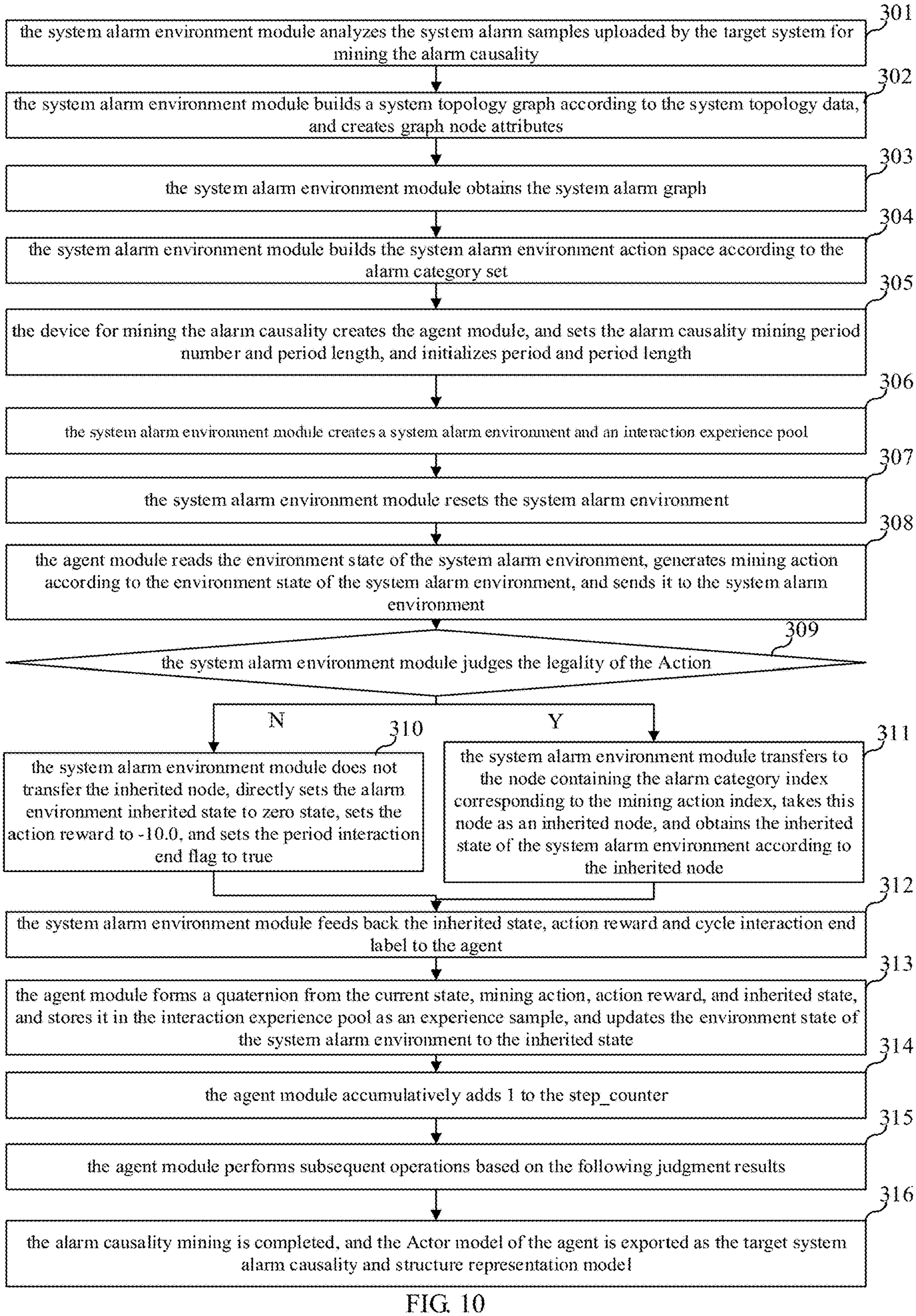
FIG. 10 is a second schematic diagram of a process of obtaining the alarm causality model by the device 20 for mining the alarm causality according to an embodiment of the present application.

In one embodiment, as shown in FIG. 9, the device for mining the alarm causality 20 is communicatively connected with the target system for mining the alarm causality 30. The target system for mining the alarm causality 30 collects system alarm logs, alarm KPI information, and system topology, labels them with root causes, packages them into system alarm samples, and uploads the data to the device for mining the alarm causality 20. As shown in FIG. 10, the device for mining the alarm causality 20 includes an agent module 21 and a system alarm environment module 22, and the steps for obtaining the alarm causality model are as follows:

Step 301: the system alarm environment module 22 analyzes the system alarm samples uploaded by the target system for mining the alarm causality.

Step 302: the system alarm environment module 22 builds a system topology graph according to the system topology data, and creates graph node attributes. Node attributes include alarm feature vector v, alarm category index wid and node root cause label rcn. The alarm logs of all system alarm samples are cleaned, converged, and classified to obtain the alarm category set, and assign indexes to the alarm categories.

Step 303: the system alarm environment module 22 obtains the system alarm graph. Specifically, taking a single sample as an example, the system alarm environment module 22 combines word2vec technology to vectorize the alarm log of the node to obtain the log vector of the node; the node alarm KPI information is vectorized to obtain the KPI vector of the node; the log vector and the KPI vector are spliced and merged to obtain the alarm feature vector of the node; the alarm feature vector is assigned to the attribute v of the node corresponding to the system topology graph; according to the assignment result of the alarm category index in step 203, the alarm category index of the node is obtained, and the attribute wid of the node corresponding to the system topology graph is assigned with a value; the attribute rcn value of the root cause node in the system topology graph is set to 1, and the attribute rcn values of other nodes are set to 0 according to the root cause label information.

The system alarm graph obtained above is stored in the system alarm graph set.

Step 304: the system alarm environment module 22 builds the system alarm environment action space according to the alarm category set. Specifically, each alarm category corresponds to a mining action, and the mining action index is consistent with the alarm category index.

Step 305: the device for mining the alarm causality 20 creates the agent module 21, and sets the alarm causality mining period number (episode_num) and period length (episode_len), and initializes period and period length counters episode_counter=0, step_counter=0. The agent module 21 may include an Actor model and a Critic model.

Step 306: the system alarm environment module 22 creates a system alarm environment and an interaction experience pool.

Step 307: the system alarm environment module 22 resets the system alarm environment. First, a system alarm graph is randomly obtained from the system alarm graph set as the current system alarm graph A, and then a node with an out-degree not 0 is randomly selected from the current system alarm graph A as the current node, and finally the environment state (State) of the system alarm environment is fused to obtain according to the alarm feature vector v of the current node and its adjacent nodes, and the environment state of the system alarm environment is fed back to the agent module 21.

Step 308: the agent module 21 reads the environment state of the system alarm environment, generates mining action (Action) according to the environment state of the system alarm environment, and sends it to the system alarm environment.

Step 309: the system alarm environment module 22 judges the legality of the Action, that is, judges whether the mining action is in the local action space of the current node. If the Action is illegal, go to step 310. If legal, go to step 311.

Step 310: the system alarm environment module 22 does not transfer the inherited node, directly sets the alarm environment inherited state (State_) to zero state, sets the action reward to −10.0, and sets the period interaction end label (done) to true (True). Then step 212 is executed.

Step 311: the system alarm environment module 22 transfers to the node containing the alarm category index (wid) corresponding to the mining action index, takes this node as an inherited node, and obtains the inherited state (State_) of the system alarm environment according to the inherited node. If the inherited node is rcn=1, then the action reward (reward) is set to 50.0, and the cycle interaction end label (done) is set to True; if the out-degree of the inherited node=0, then the action reward is set to −1.0, cycle interaction end label (done) is set to True; if the inherited node is the in-degree adjacent node of the root cause node, then the action reward is set to 1.0, and the cycle interaction end label is set to False; if the inherited node is a normal node, then the action reward is set to 0.0, the period interactive end label is set to False.

Step 312: the system alarm environment module 22 feeds back the inherited state, action reward and cycle interaction end label to the agent 21.

Step 313: the agent module 21 forms a quaternion (State, Action, reward, State_) from the current state, mining action, action reward, and inherited state, and stores it in the interaction experience pool as an experience sample, and updates the environment state (State) of the system alarm environment to the inherited state State_.

Step 314: the agent module 21 accumulatively adds 1 to the step_counter.

Step 315: the agent module 21 performs subsequent operations based on the following judgment results:

If it is determined that the cycle interaction label done=False and step_counter<episode_len, jump to step 308;

If the cycle interaction label is done=True or step_counter>=episode_len, then the episode_counter is cumulatively incremented by 1, and the model optimization of the agent (including Actor model and Critic model) is performed using the experience samples in the interaction experience pool, so that the agent can maximize the cumulative return of interaction;

If episode_counter<episode_num, go to step 307, otherwise go to step 308.

Step 316: the alarm causality mining is completed, and the Actor model of the agent is exported as the target system alarm causality and structure representation model. It can provide secondary development support for the root cause location of system failures.

The step division of the above various methods is only for the sake of clarity of description. During implementation, it can be combined into one step or some steps can be split and decomposed into multiple steps. As long as they include the same logical relationship, they are all within the protection scope of the present application; Adding insignificant modifications or introducing insignificant designs to the algorithm or process, but not changing the core design of the algorithm and process are all within the protection scope of the present application.

Figure 11:
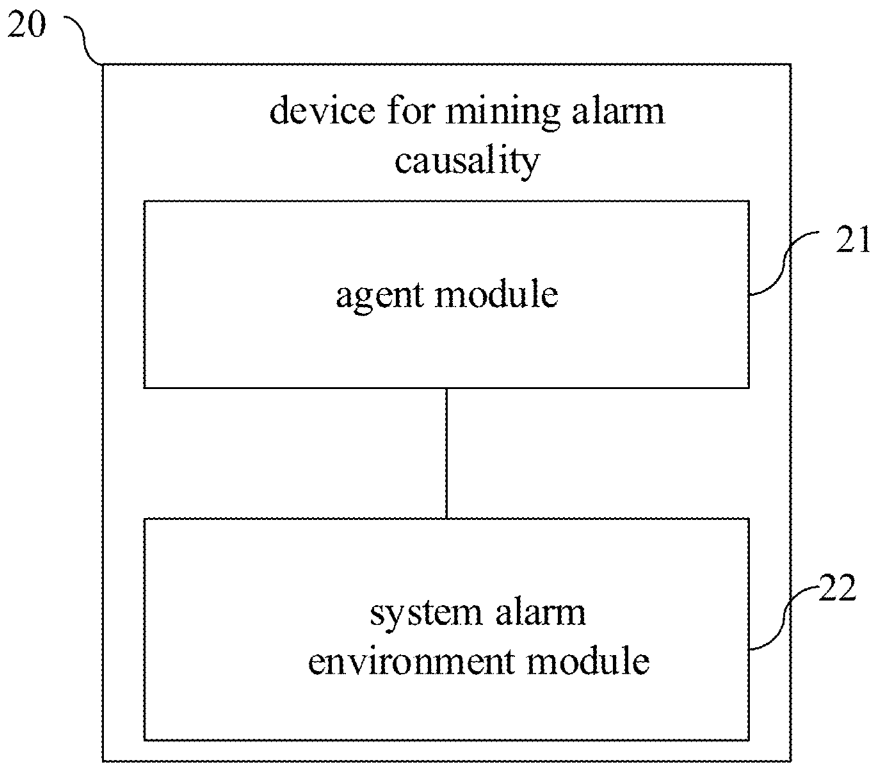
FIG. 11 is a schematic structural diagram of the device for mining the alarm causality according to another embodiment of the present application.

The embodiment of the present application also provides a device for mining an alarm causality. As shown in FIG. 11, the device for mining the alarm causality 20 includes: an agent module 21 and a system alarm environment module 22. The system alarm environment module 21 can build a system alarm environment with deep reinforcement learning based on the system alarm information and the root cause label data of the system alarm information; the agent module 21 based on deep reinforcement learning interacts with the system alarm environment module 22 to learn and generate the alarm causality model for representing the alarm causality and structure. For the function components and interaction modes of the agent module 21 and the system alarm environment module 22, reference may be made to the relevant descriptions of the above-mentioned embodiments, which will not be repeated here.

It is not difficult to find that this embodiment is a device implementation manner corresponding to the above-mentioned method embodiment, and this embodiment can be implemented in cooperation with the above-mentioned method embodiment. The relevant technical details mentioned in the foregoing method embodiments are still valid in this embodiment, and will not be repeated here in order to reduce repetition. Correspondingly, the relevant technical details mentioned in this embodiment can also be applied to the above method embodiments.

It is worth mentioning that all the modules involved in this embodiment are logical modules. In practical applications, a logical unit can be a physical unit, or a part of a physical unit, or a combination of multiple physical units. In addition, in order to highlight the innovative part of the present application, units that are not closely related to solving the technical problem proposed in the present application are not introduced in this embodiment, but this does not mean that there are no other units in this embodiment.

Figure 12:
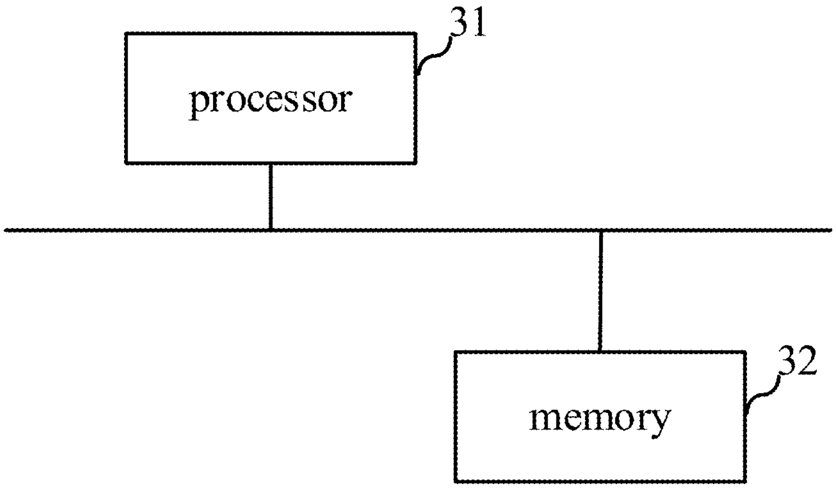
FIG. 12 is a schematic structural diagram of the device for mining the alarm causality according to another embodiment of the present application.

The embodiment of the present application also provides a device for mining an alarm causality, as shown in FIG. 12, including: at least one processor 31; and a memory 32 communicated with at least one processor 31; instructions executed by the processor 31 are stored in the memory 32; the instructions are executed by at least one processor 31, so that the at least one processor 31 can execute the above method embodiments.

The memory 32 and the processor 31 are connected by a bus, and the bus may include any number of interconnected buses and bridges, and the bus connects one or more processors 31 and various circuits of the memory 32 together. The bus may also connect together various other circuits such as peripherals, voltage regulators, and power management circuits, all of which are well known in the art and therefore will not be further described herein. The bus interface provides an interface between the bus and the transceiver. A transceiver may be a single element or multiple elements, such as multiple receivers and transmitters, providing units for communicating with various other devices over a transmission medium. The data processed by the processor 31 is transmitted on the wireless medium through the antenna, further, the antenna also receives the data and transmits the data to the processor 31.

The processor 31 is responsible for managing the bus and general processing, and may also provide various functions including timing, peripheral interfacing, voltage regulation, power management, and other control functions. And the memory 32 may be used to store data used by the processor 31 when performing operations.

The embodiment of the present application also provides a computer-readable storage medium storing a computer program. The above method embodiments are implemented when the computer program is executed by the processor.

That is, those skilled in the art can understand that all or part of the steps in the method of the above-mentioned embodiments can be completed by instructing related hardware through a program; the program is stored in a storage medium, and includes several instructions to make a device (it may be a single-chip microcomputer, a chip, etc.) or a processor to execute all or part of the steps of the methods in the various embodiments of the present application. The aforementioned storage medium includes: U disk, mobile hard disk, read-only memory (ROM), random access memory (RAM), magnetic disk or optical disc, etc., which can store program codes.

Those skilled in the art can understand that the above-mentioned implementation modes are specific embodiments for realizing the present application, and in practical applications, various changes can be made to it in form and details without departing from the spirit and the scope of the present application.

What is claimed is:

1. A method for mining an alarm causality, comprising:

building a system alarm environment for deep reinforcement learning based on system alarm information and root cause label data of the system alarm information, wherein the building comprises obtaining a system alarm graph indicating the system alarm information and the root cause label data of the system alarm information, wherein the system alarm graph comprises an alarm category index and a root cause label of each node; and learning and generating an alarm causality model representing the alarm causality and structure through an interaction between a deep reinforcement learning agent and the system alarm environment, wherein the learning and generating comprises:

selecting a mining action according to a current environment state of the system alarm environment;

feeding back a reward value and an inherited state to the agent, wherein the reward value is determined according to a reward mechanism, and wherein the inherited state is determined by a state transfer mechanism according to the current environment state, the mining action, and a local action space of a current node, wherein a mining action index corresponds to the alarm category index; and learning and generating the alarm causality model according to the mining action and the reward value.

2. The method for mining the alarm causality according to claim 1, wherein the environment state of the system alarm environment is determined according to an alarm state of the current node, and the alarm state of the current node is generated according to the alarm feature vector of the current node and an alarm feature vector of adjacent nodes of the current node.

3. The method for mining the alarm causality according to claim 2, wherein the reward mechanism comprises: determining the reward value according to whether the mining action belongs to the local action space of the current node, and after the mining action is performed, a type of an inherited node of the system alarm environment.

4. The method for mining the alarm causality according to claim 3, wherein during an interaction process between the agent and the system alarm environment, the method further comprises: executing the mining action and transferring the system alarm environment from the current node to the inherited node;

in response to that the mining action executed currently is an illegal action, feeding back a negative reward; and in response to that the mining action executed currently belongs to an action in a local action space of the current node, and the inherited node is a root cause node, feeding back a positive reward.

5. The method for mining the alarm causality according to claim 4, wherein:

in response to that the mining action executed currently belongs to the action in the local action space of the current node, and the inherited node is an in-degree adjacent node of the root cause node, feeding back the positive reward; and in response to that the mining action executed currently belongs to the action in the local action space of the current node, and the inherited node is a zero out-degree node, feeding back a negative reward.

6. The method for mining the alarm causality according to claim 4, wherein in response to that the mining action executed currently belongs to the action in the local action space of the current node, and the inherited node is a normal node, feeding back a zero reward.

7. The method for mining the alarm causality according to claim 4, wherein the interaction termination condition between the agent and the system alarm environment comprises at least one of: a number of interactions reaches an interaction threshold, the inherited node is the root cause node, or the mining action does not belong to the local action space of the current node.

8. The method for mining the alarm causality according to claim 2, wherein, during an interaction process between the agent and the system alarm environment, the method further comprises:

triggering an environment state reset mechanism in response to that an interaction termination condition is met, after the system alarm environment executes the mining action sent by the agent.

9. The method for mining the alarm causality according to claim 8, wherein the environment state reset mechanism comprises:

selecting the system alarm graph randomly as the system alarm graph of the system alarm environment in a system alarm graph set generated based on the system alarm information and the root cause label data of the system alarm information; selecting a node whose out-degree or in-degree is not 0 as a starting node from the system alarm graph of the system alarm environment; and configuring the alarm state of the starting node as the environment state of the system alarm environment, and feeding back to the agent, so that the agent is interacted with the system alarm environment again.

10. The method for mining the alarm causality according to claim 2, further comprising:

calculating a first fusion feature vector of the alarm feature vector of the adjacent nodes of the current node, wherein the first fusion feature vector is a mean value of the alarm feature vector of the adjacent nodes of the current node; and splicing the alarm feature vector of the current node with the first fusion feature vector to obtain a second fusion feature vector, wherein the second fusion feature vector is the alarm state of the current node.

11. The method for mining the alarm causality according to claim 1, wherein the system alarm information comprises system alarm log data and/or alarm key performance indicator information.

12. A device for mining an alarm causality, comprising:

at least one processor; and a memory connected in communication with the at least one processor;

wherein, the memory stores instructions executable by the at least one processor, and the instructions are executed by the at least one processor so that the method for mining the alarm causality according to claim 1 is realized by the at least one processor.

13. A non-transitory computer-readable storage medium, storing a computer program, wherein when the computer program is executed by a processor, the method for mining the alarm causality according to claim 1 is realized.

* * * * *